March 8, 1960
R. S. ZEBARTH
2,927,341
CLEANER AND CONDITIONER FOR POULTRY PARTS
Filed Nov. 5, 1956
2 Sheets-Sheet 1
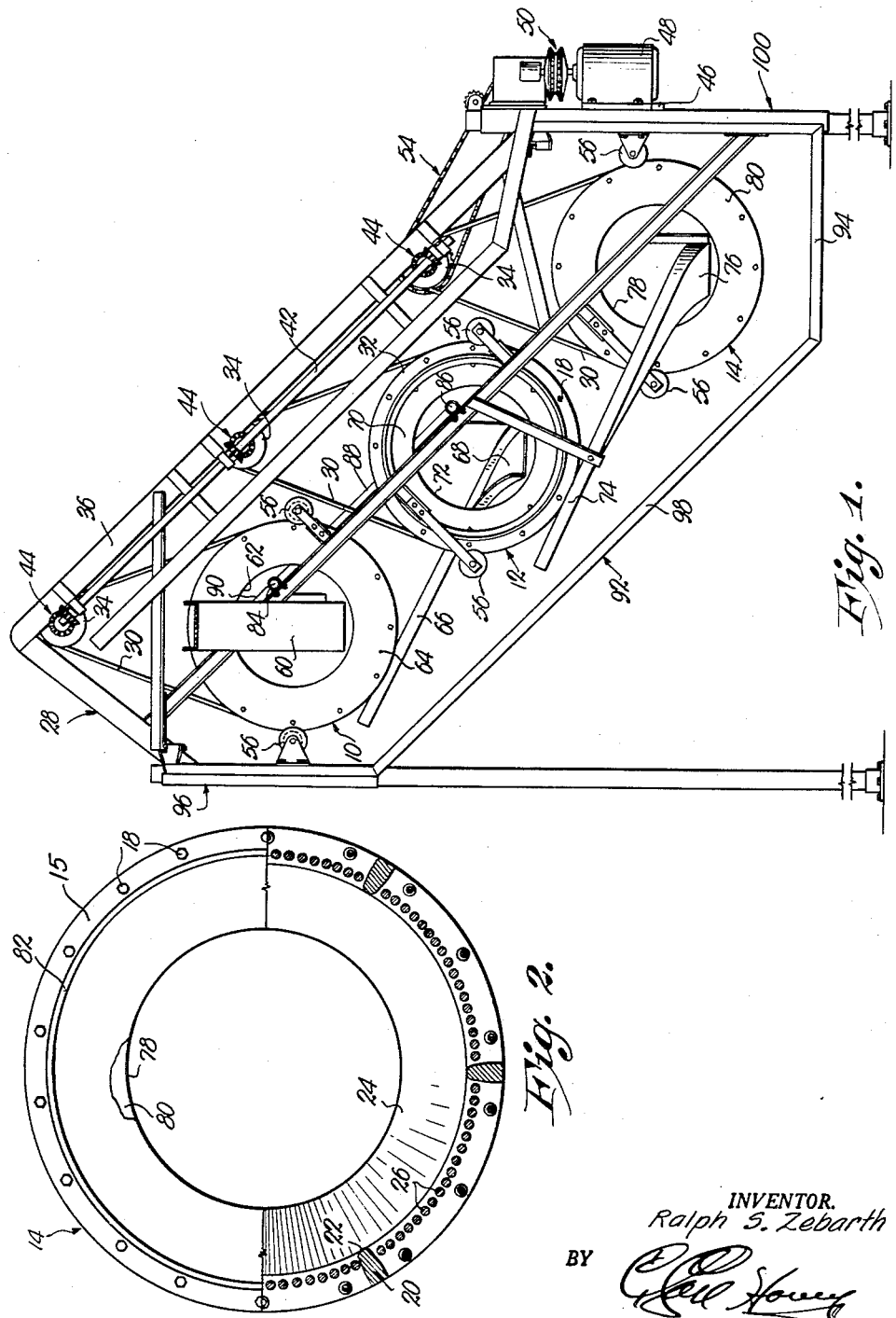
INVENTOR.
Ralph S. Zebarth
BY
ATTORNEY.

March 8, 1960 R. S. ZEBARTH 2,927,341
CLEANER AND CONDITIONER FOR POULTRY PARTS
Filed Nov. 5, 1956 2 Sheets-Sheet 2
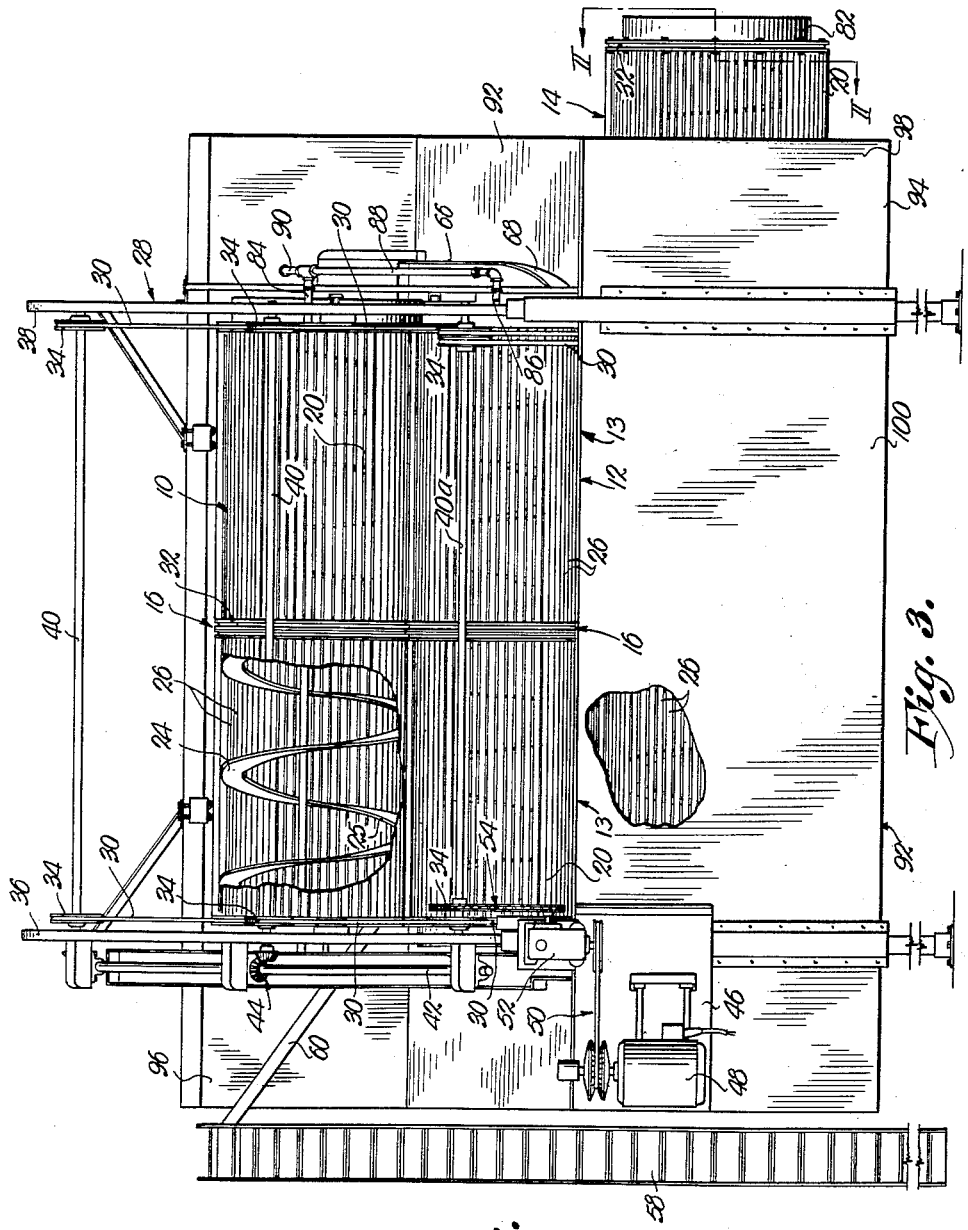
Fig. 3.
INVENTOR.
Ralph S. Zebarth
BY
ATTORNEY.

United States Patent Office 2,927,341
Patented Mar. 8, 1960

2,927,341

CLEANER AND CONDITIONER FOR POULTRY PARTS

Ralph S. Zebarth, Hickman Mills, Mo., assignor, by mesne assignments, to Gordon Johnson Company, Kansas City, Mo., a corporation of Missouri Application November 5, 1956, Serial No. 620,333

2 Claims. (Cl. 17—11)

This invention relates to apparatus for handling small parts and adapted to not only clean such parts but to condition the same as they are advanced through a serpentine path of travel and simultaneously tumbled to not only impart a massaging action thereto, but to assure removal of all foreign matter therefrom.

Particularly, the invention relates to apparatus for cleaning and conditioning poultry parts following evisceration and immediately prior to packaging, the machine being adapted to not only present a more palatable appearance in the parts themselves but capable of removing virtually all traces of blood from the cells of the meat.

It has not heretofore been fully appreciated by poultry processors that edible parts cleaned in the usual manner prior to packaging, while apparently clean and, therefore, in the best condition for eating, are not in fact, as completely cleaned or as fully conditioned as might be desired. It is not possible, through conventional methods heretofore practiced, to remove all traces of blood within the many tiny cells of the meat and the taste thereof is, therefore, manifestly effected.

It is the most important object of the present invention, therefore, to provide a machine which, by virtue of the massaging action imparted to the poultry parts, removes all blood therefrom and replaces the same with water that is used as the cleaning medium during the time the parts are advanced through the machine.

Another important object of the instant invention is to provide apparatus for cleaning poultry parts that massages the same in a manner and sufficiently to tenderize the meat and thereby increase its palatability.

Another object of the present invention is to provide poultry handling equipment which, by virtue of the advancement of poultry parts through streams of water as the parts are continuously tumbled, causes the same to attain a glistening, fresh-like sparkling glaze, which appearance is manifestly pleasing to a potential purchaser.

All of the aforementioned objects, and others to be made clear as the following specification progresses, are attained through employment of the apparatus illustrated in the drawings, wherein:

Figure 1 is an end elevational view of a cleaner and conditioner for poultry parts made pursuant to the present invention.

Fig. 2 is an enlarged, end elevational view of one of the drums partially in section taken on irregular line II—II of Fig. 3; and Fig. 3 is a front elevational view of the cleaner and conditioner, parts being broken away for clearness.

As is most apparent in Figure 1 of the drawings, the apparatus about to be described includes essentially a plurality of elongated, preferably cylindrical drums 10, 12 and 14 having their longitudinal axes disposed horizontally (see Fig. 3) and at different elevations.

It is desirable that the drums be disposed progressively higher as the upper drum 10 is approached, and while the same are aligned in an inclined plane for advantageous reasons to hereinafter become apparent, it is conceivable that they might well be superimposed within a vertical stack if desired. Disposition of the series of drums in a horizontal plane however, would necessitate a more expensive and complicated means of transfer of parts from drum to drum than is contemplated by the instant invention.

The drums 10, 12 and 14 are virtually identical except only for the fact that the lower drum 14 is longer so that the same extends outwardly beyond one end of the machine as shown in Fig. 3.

The ends of the drums are open to present inlet and outlet openings and each drum is foraminous throughout the entire length thereof. To this end, each drum is subdivided into a plurality of identical sections 13 having peripheral flanges 15 at the ends of the sections in abutting relationship presenting joints 16 releasably connected by a circular series of fasteners 18 shown best in Fig. 2. The said flanges at the joints 16 are integrally connected by longitudinal ribs 20 which extend inwardly beyond the inner surfaces of the drums to present means for tumbling the parts as the same are advanced longitudinally of the drums. To this end, as seen in Fig. 2, the innermost longitudinal edges 22 which actually come into contact with the poultry parts, are rounded transversely to obviate any damage to the parts and prevent lodgment or jamming which would interrupt the continuous flow contemplated by the invention.

Also cast or otherwise formed integrally with the flanges aforementioned and the ribs 20, is a helical rib 24 within each drum section respectively. The outermost spiral edge 25 of the helix 24 is welded directly to the edges 22 of the ribs 20. The side walls of sections 13 are defined in addition to the ribs 20, by a plurality of relatively small, spaced-apart, longitudinal tumbling rods 26 carried by flanges 15 at the ends of sections 13 by extension therethrough and held in place by welding or in any other suitable manner.

The drums 10, 12 and 14 are all supported by a framework broadly designated by the numeral 28 for rotation on their parallel, longitudinal axes. A novel means of support is provided for the drums including continuous belts 30, there being a belt 30 at each end respectively of each drum. To this end, the aforementioned adjacent flanges 15 which have one function of presenting the joints 16, are each formed with a continuous groove 32 and, therefore flanges 15 at the ends of the drums receive the belts 30. Belts 30 are also trained over pulleys 34 above the drums and rotatably carried by the frame 28 to the end that each of the drums is suspended from a pair of pulleys 34.

Frame 28 includes a pair of spaced-apart, upright frame sections 36 and 38, it being noted that drums 10 and 12 span the distance between the sections 36 and 38, whereas the drum 14 extends beyond the section 38. Sections 36 and 38 journal a horizontal shaft 40 above each drum respectively and each shaft 40 in turn receives a pair of the pulleys 34. A drive shaft 42 rotatably carried by the frame section 36 is operably connected with the three shafts 40 by intermeshing bevel gears 44 on shafts 40 and 42 respectively, it being noted that the gears 44 for the drums 10 and 14 are disposed to rotate the latter in one direction, whereas the gears 44 for the drum 12 are disposed to rotate the intermediate drum 12 in the opposite direction.

A plate or the like 46, mounted on the frame section 36 at the lowermost and forwardmost end thereof, supports an electric motor 48 that is operably coupled with the lowermost of the shafts 40a by belt and pulley means 50 to a speed reducer 52 and from the latter to the said lowermost shaft designated by the numeral 40a by chain and sprocket means 54. It is seen, therefore, that as the prime mover 48 drives the shaft 40a, the shaft 42 is in turn driven to rotate all of the drums 10, 12 and 14 continuously and preferably at the same rate of speed.

Flanges 15 of the drums which receive the belts 30 through the medium of grooves 32, are engaged by rollers 56 preferably made from rubber or the like and carried by the frame sections 36 and 38 to hold the drums against swinging movement and, therefore, in substantial parallelism.

An elevator 58 at one end of the machine is provided to convey the poultry parts from the eviscerating tables (not shown) to the inlet end of the uppermost drum 10. From the elevator 58, such parts are delivered to an inclined chute or trough 60 that extends into inlet opening 62 of drum 10. Opening 62 is formed in a flat, disc-like plate 64 mounted on the drum 10, the opening 62 being of lesser diameter than the inside diameter of helix 24 so that the poultry parts will not accidentally fall from the drum 10 but will be immediately advanced therealong to the opposite end of the drum 10 by the helix 24 for the drum 10.

No such plate 64 is provided on the opposite outlet end of the drum 10 and, therefore, as the parts are conveyed thereto, they drop into an inclined chute or trough 66 underlying the outlet end of the drum 10 as seen in Figs. 1 and 3, and terminating in an inwardly curved portion 68 which extends into the inlet end of the drum 12. Drum 12 is likewise provided with a plate 70 similar to plate 64 having an inlet opening 72 of reduced diameter as in the case of inlet opening 62 for drum 10.

Since the drum 12 rotates oppositely to the drum 10, the poultry parts delivered thereto will be conveyed by its helix 24 in a direction opposite to the direction of travel of the poultry parts within the drum 10. When the parts reach the outlet end of the drum 12 which is devoid of a plate such as at 64 and 70, such parts fall into another inclined open top chute or trough 74 substantially identical with the trough 66 and having a downwardly and laterally inclined curved terminal end 76 emptying into the drum 14. Here again, drum 14 is provided with an inlet opening 78 formed in a circular disc 80. Since drum 14 rotates in the same direction as the drum 10, the poultry parts are conveyed therealong by its helix 24 to the outlet end of drum 14 shown in Fig. 3. A continuous band 82 at the outlet end of the drum 14 discharges the poultry parts outwardly beyond the drum 14 to any suitable receiving means (not shown) such as a conveyor which carries the cleaned and conditioned parts to a point of packaging or other handling.

Drums 10 and 12 are provided with perforated or nozzled manifolds 84 and 86 respectively, extending longitudinally therethrough and carried by the frame sections 36 and 38. The ends of the manifolds 84 and 86 adjacent the frame section 36 are closed, but the opposite ends thereof are joined by a pipe 88 that in turn couples with a supply pipe 90 that connects with a source of water under pressure (not shown).

An open top basin broadly designated by the numeral 92, is disposed to collect the water sprayed against the parts as the same are conveyed through the drums and to collect all foreign matter removed therefrom. The basin 92 has a bottom 94, an uppermost upstanding rear wall 96, and an inclined panel 98 interconnecting the bottom 94 and the wall 96. Additionally, basin 92 has a front wall 100 and a pair of end walls suitably supported by the frame sections 36 and 38 in embracing relationship thereto. The said end walls have been removed from the drawings for clearness but it is sufficient to point out that the same may interconnect walls 96 and 100 and join with the parts 94 and 98 of the basin 92 in any suitable manner. Similarly, the basin 92 may be drained for disposal of the water and foreign matter to waste in a manner not pertinent to the broad concepts of the instant invention.

While the manner of operation of the apparatus just above described has been made clear throughout the description thereof, certain important features should be noted. As soon as the poultry parts such as the legs, wings, backs, thighs, etc. slide into the drum 10 along chute 60, they are subjected to a tumbling action by the ribs 20 as the helix 24 advances the same longitudinally of the drum 10. Simultaneously, water spraying from the manifold 84 against the poultry parts thoroughly cleanses the same and as such parts tumble over each other, a massaging action takes place to assure complete removal of all undesired foreign matter.

The massaging action is furthered by virtue of the nature of the rods 26, it being seen that the poultry parts gently roll along the rods 26 during the continuous rotation of the drums. As the parts tumble within the drums they are gently advanced toward the outlet ends thereof by the helixes 24 and since such parts may slide smoothly along the rods 26 longitudinally thereof, along the edges 22 of the ribs 20, and along the faces of the ribs 24, no damage can occur thereto by rough or sharp parts which would tend to tear the meat or the skin thereon. The free sliding movement of the parts through the drums is augmented by virtue of the fact that all components of the drums are kept in a moist, lubricated condition by the water emanating from the manifolds 84 and 86.

The results of the combined action of the rods 26, the ribs 20, the helixes 24 and the water emanating from the manifolds 84 and 86, together with the continuous rotation of the drums, have to do primarily with cleaning and conditioning of the parts. The massaging action gently squeezes all remaining blood from the tiny vessels and cells of the meat and such small blood particles are washed away through the foraminous drums by the water where it is collected by the underlying basin 92.

The gelatin-like lymph forming a part of the meat has an affinity for water and, therefore, the interstices forming the cells and from which the blood has been massaged, fills with the water presenting a firm, yet tenderized, edible part. The massaging results in the tenderizing of the meat and brings the said lymph to the surface and the cleaned and conditioned parts have a palatable appearance because the same glisten and sparkle. The fresh-like appearance is a result of the glaze that is produced thereon by the action of the water and the bringing to the surface of the lymph forming a part of the meat.

In this respect, the importance of gentle handling of the parts cannot be over-emphasized and while the liquid emanating from the manifolds 84 and 86 should be at sufficient force to assure complete cleansing of the parts, care must be taken not to wash away the lymph which is desirably retained not only because of appearance, but proper taste when the parts are ultimately prepared for eating.

Cleaning and conditioning of poultry parts in the above described manner is important also from the standpoint of packaging and freezing since proper cleaning manifestly helps to prevent spoilage and the aforesaid conditioning facilitates the freezing step.

It is to be noted that no liquid is sprayed upon the parts as the same are conveyed through the drum 14, the latter serving therefore, the purpose of drying the parts and causing excess moisture to be massaged therefrom and to drain through the foraminous side wall of the drum 14 prior to discharge through the ring 82. Inasmuch as the drum 14 is provided with an additional section and extends beyond the proximal end of the machine, the above-mentioned side wall which is attached to the frame section 38, is manifestly provided with an opening through which the drum 14 extends.

Disposition of the drums in the manner illustrated in Figure 1 permits the use of the inclined troughs 66 and 74 as a simple, inexpensive means of transfer of the parts from drum to drum, all without undue drop and possible damage to the poultry parts. The troughs 66 and 74 are likewise lubricated by the water and the parts slide smoothly therealong without operator attention.

Having thus described the invention what is claimed as new and desired to be secured by Letters Patent is:

1. Apparatus for cleaning and conditioning poultry parts comprising a frame; a plurality of elongated, open-ended drums mounted on the frame for rotation about their longitudinal axes, said axes being disposed horizontally within an inclined plane at progressively higher elevations, and each of said drums being provided with an open inlet end and an open outlet end; a continuous spiral rib within each drum for conveying articles from said inlet end through said outlet end thereof as the drums are rotated; inclined trough structure stationary on the frame exteriorly of the drums for transferring the articles from the outlet end of each drum into the inlet end of the next adjacent drum; and means on the frame and including parts extending into certain of the drums for directing a massaging liquid against the articles as the same are conveyed, each drum being provided with a series of spaced-apart, longitudinal tumbling rods forming the side wall thereof, the spaces between said rods being insufficient to clear said parts, and each drum being provided with longitudinally extending ribs therewithin for augmenting the tumbling of the articles as the same are conveyed therealong.

2. Apparatus of the kind set forth in claim 1 wherein is provided belt and pulley structure for each drum respectively, the belts of said structures suspending the drums.

References Cited in the file of this patent

UNITED STATES PATENTS

| | | |
|---|---|---|
| 145,668 | Mase | Dec. 16, 1873 |
| 207,307 | Schaschue | Aug. 20, 1878 |
| 265,491 | Felthousen | Oct. 3, 1882 |
| 1,220,090 | Gmeinder | Mar. 20, 1917 |
| 2,652,588 | Harris | Sept. 22, 1953 |
| 2,735,226 | Franks et al. | Feb. 21, 1956 |

FOREIGN PATENTS

| | | |
|---|---|---|
| 643,383 | France | July 2, 1929 |
| 378,674 | Great Britain | Aug. 18, 1932 |